United States Patent [19]
Traeger

[11] 3,793,988
[45] Feb. 26, 1974

[54] ANIMAL TOILET
[75] Inventor: Robert S. Traeger, Rochester, Ind.
[73] Assignee: KLT Industries, Inc., Rochester, Ind.
[22] Filed: Oct. 24, 1972
[21] Appl. No.: 300,110

[52] U.S. Cl. .................................................. 119/1
[51] Int. Cl. ............................................ A01k 29/00
[58] Field of Search ............... 119/1, 22, 29, 15, 19

[56] References Cited
UNITED STATES PATENTS
3,119,374  1/1964  Ladner............................... 119/29
2,039,783  5/1936  Ebeling............................... 119/15
3,274,973  9/1966  Woods et al..................... 119/29 UX Primary Examiner—Hugh R. Chamblee
Attorney, Agent, or Firm—Oltsch & Knoblock

[57] ABSTRACT

A toilet or waste disposal means for the excreta of an animal in which the excreta is carried upon a conveyor belt with the solid matter thereof being deposited in a suitable receptacle and the belt thereafter being sprayed by a suitable cleaning fluid to cleanse the belt of any urine or remaining excreta adhering to the belt.

7 Claims, 9 Drawing Figures

ANIMAL TOILET

SUMMARY OF THE INVENTION

This invention pertains to a waste disposal means and has particular application to a toilet device for animals.

The waste disposal means of this invention includes an endless conveyor belt having an upper run which is utilized to support the animal. After the animal has deposited its excreta upon the upper run of the conveyor belt, motor means causes rotation of the belt which serves to deposit the solid matter of the excreta in a suitable receptacle. The belt is subjected to a spray of cleaning fluid which removes urine and any remaining solid excreta from the belt.

An object of this invention is to provide a waste disposal device for animals which is of a sanitary and convenient operation.

Another object of this invention is to provide an animal waste disposal device which can be utilized in the home.

Still another object of this invention is to provide a toilet which pet animals can be trained to utilize.

Other objects of this invention will become apparent upon a reading of the invention's description.

DESCRIPTION OF THE PREFERRED EMBODIMENT

Figure 1:
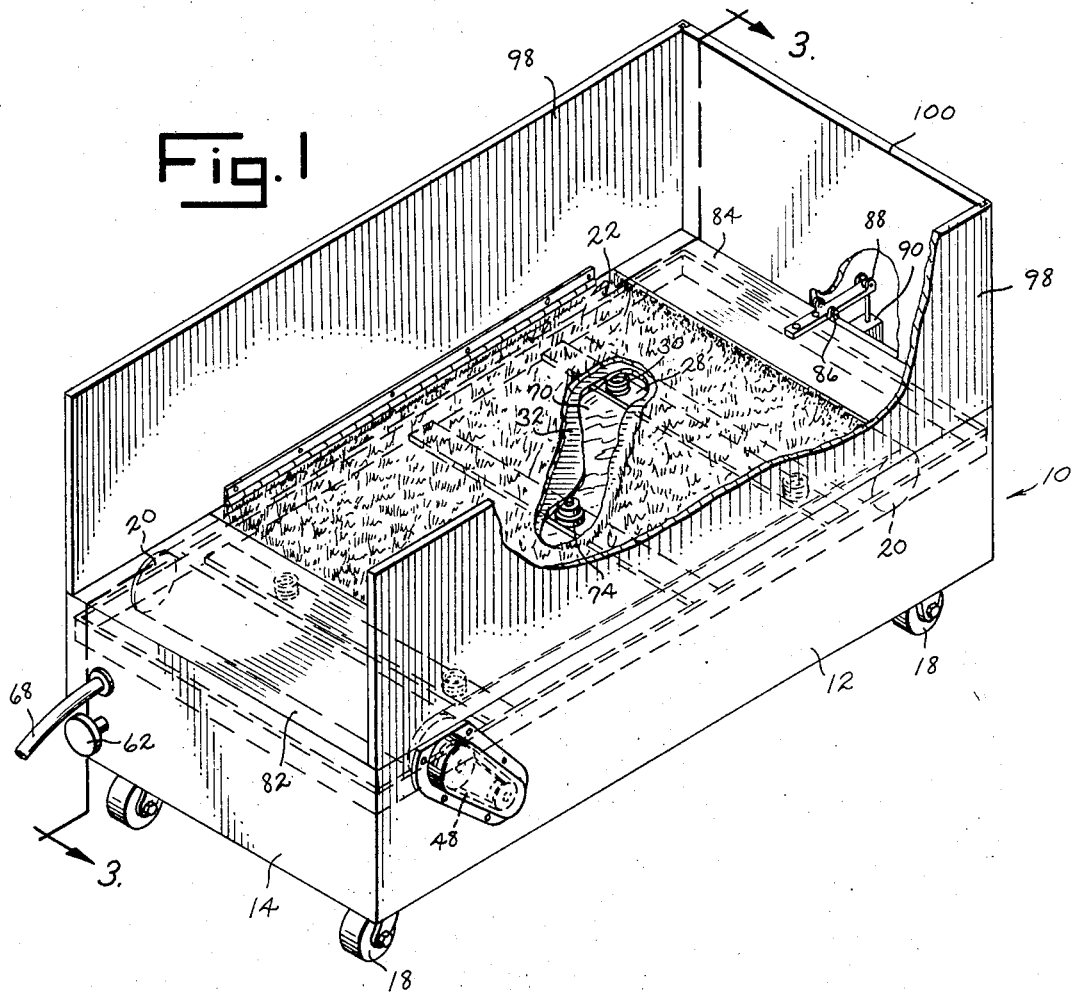
FIG. 1 is a perspective view of one embodiment of the disposal apparatus shown in operative form with portions thereof broken away for purposes of illustration.

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

The embodiment of the waste disposal device depicted in the drawings includes a box 10 which consists of sides 12, ends 14 and a bottom 16. Casters 18 may be attached to bottom 16 box 10 to facilitate movement of the disposal from one location to another.

Figure 3:
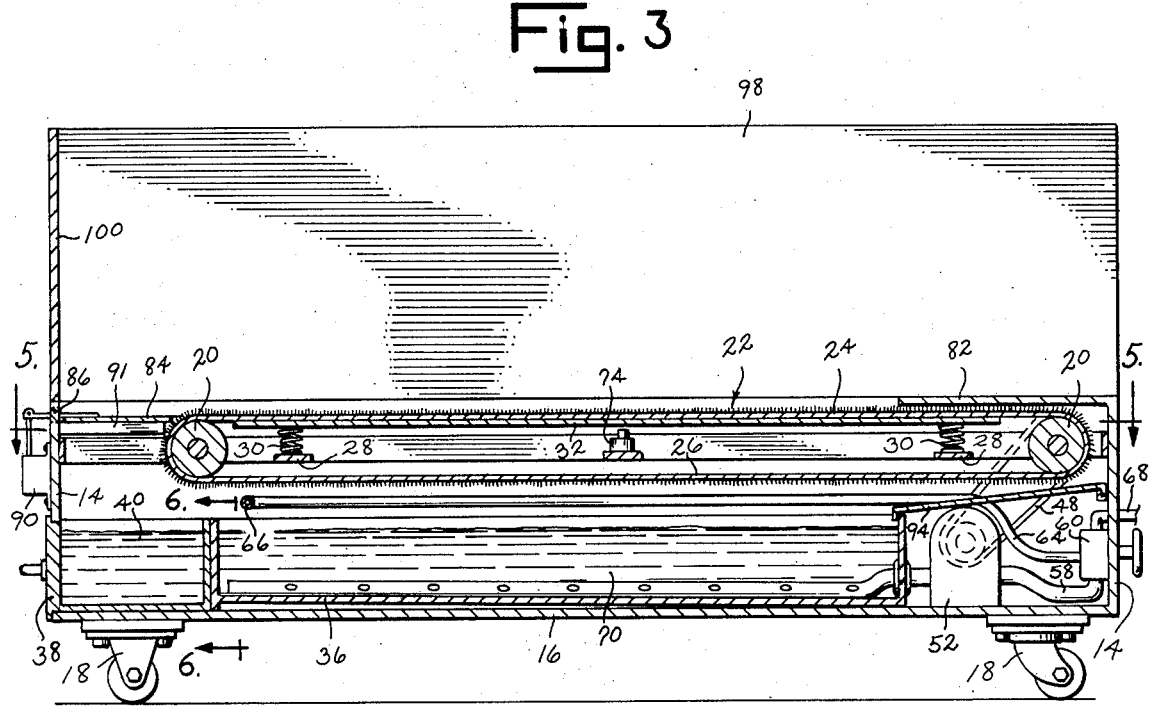
FIG. 3 is a sectional view taken along line 3—3 of FIG. 1.
Figure 4:
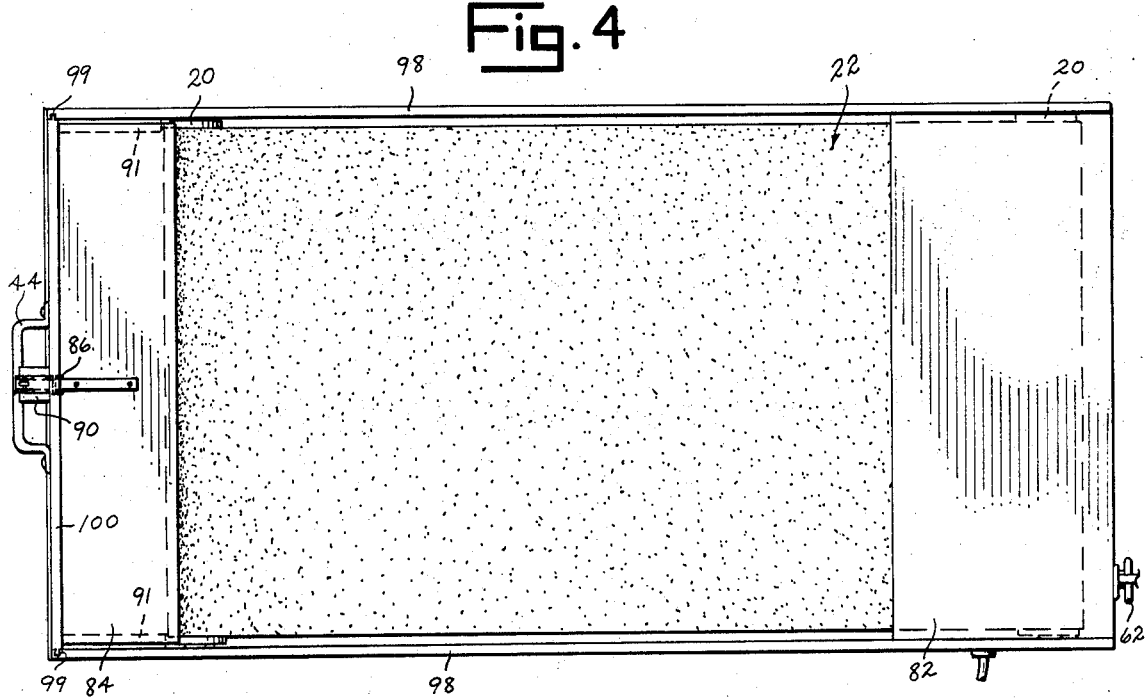
FIG. 4 is a top plan view of the disposal apparatus shown in its operative form.
Figure 5:
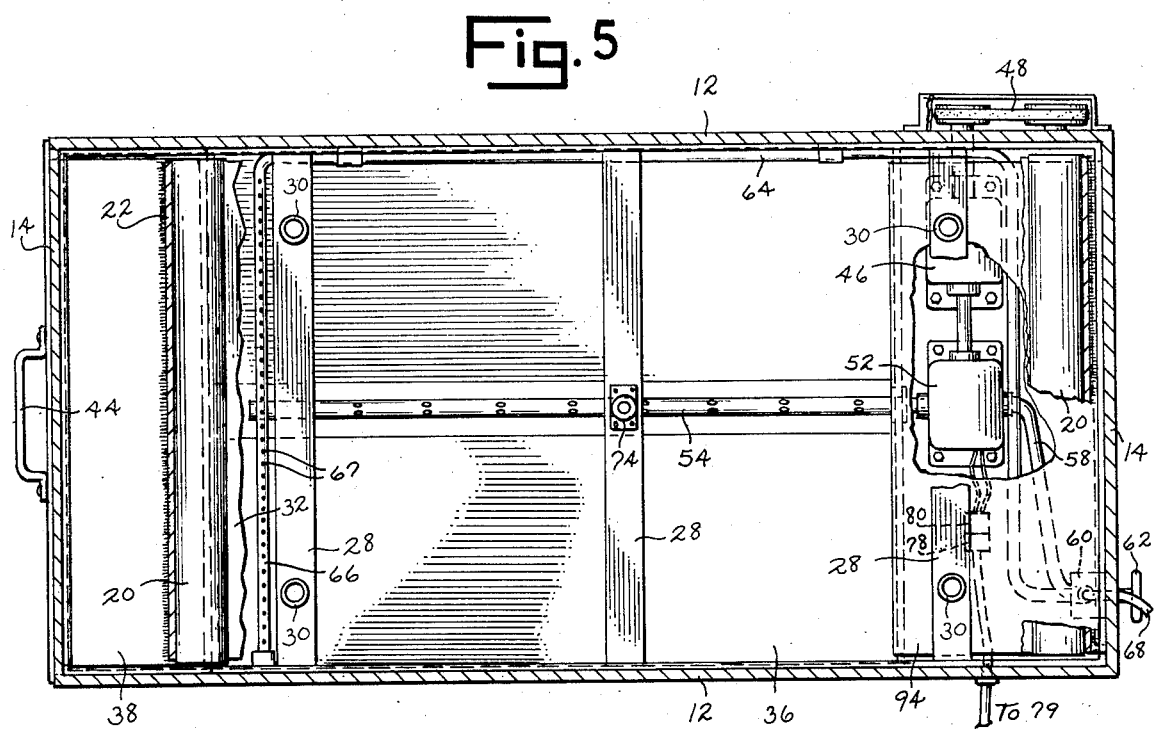
FIG. 5 is a sectional view taken along line 5—5 of FIG. 3.
Figure 6:
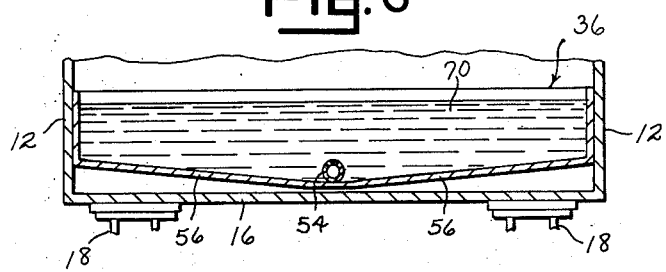
FIG. 6 is a fragmentary sectional view taken along line 6—6 of FIG. 3.
Figure 7:
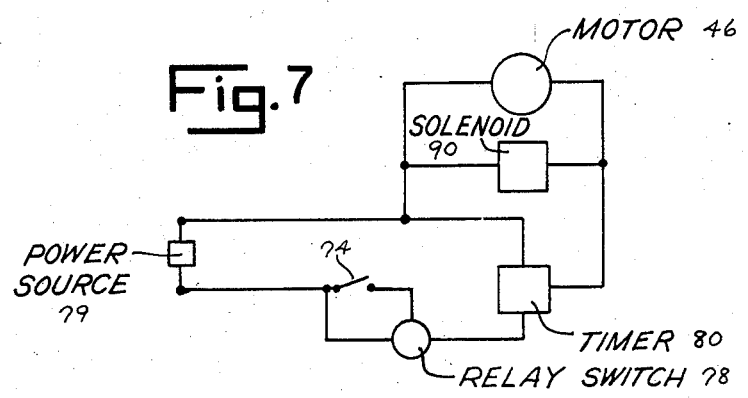
FIG. 7 is a schematic view of the actuating and power circuit for operating the disposal apparatus.
Figure 8:
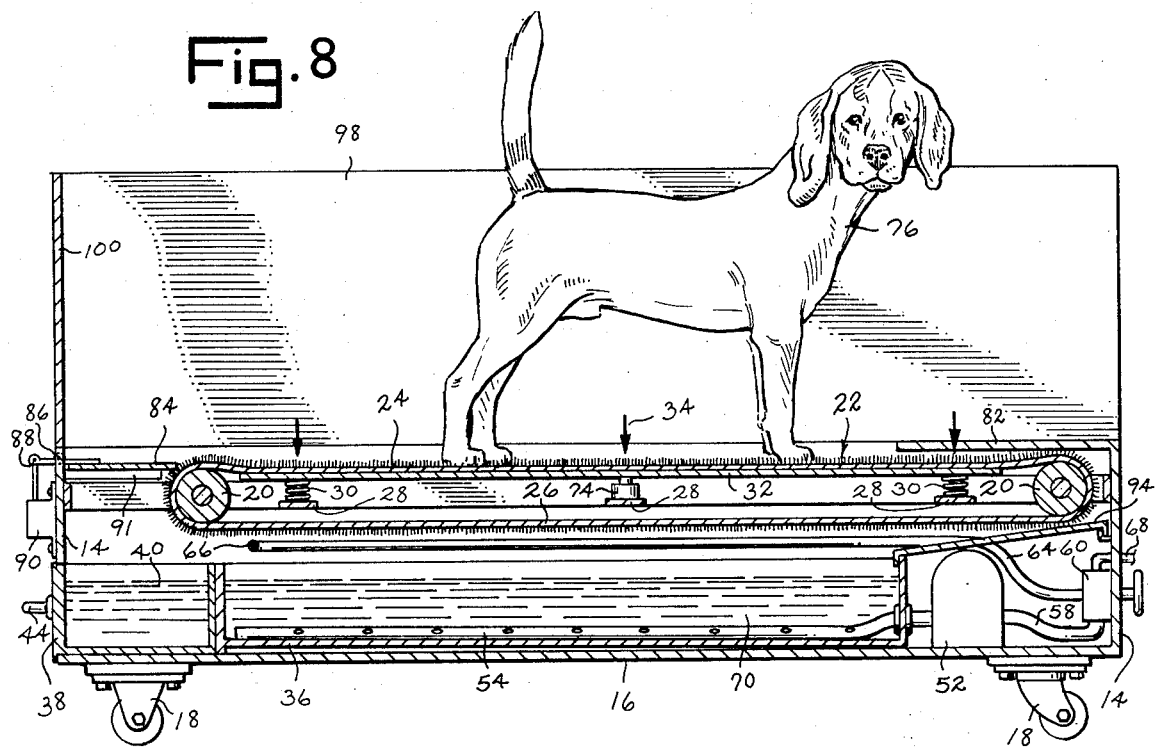
FIG. 8 is a longitudinal sectional view of the disposal apparatus showing a dog in position to utilize the apparatus.

A pair of parallel spaced rollers 20 are journaled between sides 12 of box 10. An endless conveyor belt 22 extends around rollers 20. Belt 22 is preferably constructed from a permeable grass simulating material which is non-reactive to animal excreta. Belt 22 includes an upper run 24 which is positioned adjacent the upper edge of sides 12 of the box and a lower run 26. A plurality of transversely oriented slats 28 extend between upper run 24 and lower run 26 of belt 22. Each slat 28 is supported between sides 12 with selected slats carrying spaced biasing members or sprsings 30. A platform 32 is supported upon springs 30 under and preferably in contact with the lower surface of upper run 24 of the belt, as best shown in FIG. 3. Platform 32 extends from adjacent one roller 20 to the opposite roller 20 and is depressible as shown by arrows 34 in FIG. 8 when a dog, cat or similar animal steps upon the upper run 24 of the belt.

Figure 9:
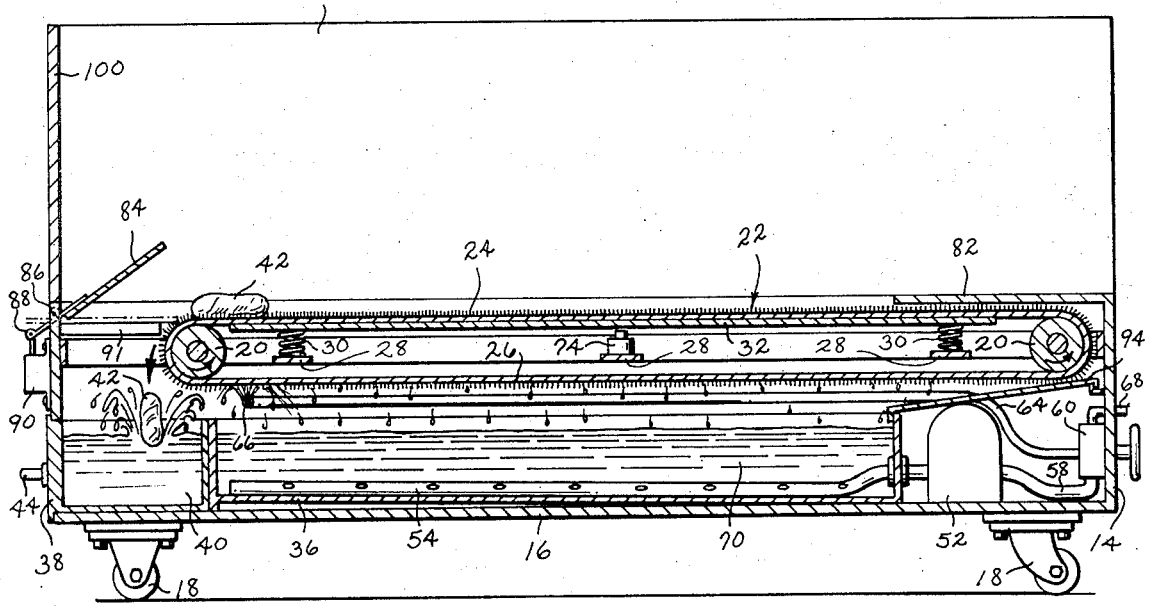
FIG. 9 is a longitudinal sectional view showing the disposal apparatus in operation after use by an animal.

A two-part receptacle means is supported by bottom 16 of box 10 below belt 22. One receptacle part constitutes a tank 36 which extends from one side 12 to the other side 12 of box 10 and which is positioned directly under lower run 26 of belt 22. The second part of the receptacle means constitutes a drawer 38. Drawer 38 is positioned during use of the disposal apparatus under the discharge end of belt 22 and is removably inserted through an opening in one end 14 of box 10. Drawer 38 extends the width of belt 22 and is preferably filled with a deodorizing liquid 40 into which the solid excreta 42 of the animal falls upon rotation of belt 22, as seen in FIG. 9. At suitable intervals of disposal use, drawer 38 is removed from box 10 and emptied. The deodorizing liquid 40 is replenished and the drawer reinserted into the box and positioned under the discharge end of belt 22. Drawer 38 is provided with a handle 44 so as to facilitate its removal and reinsertion.

At the opposite end section of box 10 from drawer 38 is located an electrical motor 46. The drive shaft of motor 46 is connected by a belt and pulley combination 48 to one of the rollers 20. A pump 52 is also connected to the drive shaft of motor 46. The inlet of pump 52 is connected to a reticulated pipe 54 which rests upon the bottom of tank 36 at the junction of the converging wall portions 56 of the tank bottom. The outlet of pump 52 is connected by conduit 58 to the inlet of a valve 60 which is also housed in the same end section of box 10 as motor 46. Valve 60 is of the three-way type which is actuated by an externally positioned handle 62 and which has two outlets. One outlet of valve 60 is connected by a conduit 64 to an elongated reticulated spray pipe 66. Spray pipe 66 extends across box 10 between sides 12 and is located under lower run 26 of belt 22 over tank 36, preferably at the discharge end of the belt. The other outlet of valve 60 is connected to a drain conduit 68. Tank 36 holds a cleansing and deodorizing liquid 70. With handle 62 of valve 60 turned so as to place pipe 54 in tank 36 in fluid communication with spray pipe 66, liquid 70 will be withdrawn upon activation of pump 52 from tank 36 and forced out openings 67 in pipe 66 against the lower run 26 of belt 22, causing the liquid excreta such as urine and any solid excreta adhering to the belt to be washed therefrom and drained into tank 36 as the belt proceeds to rotate. (See FIG. 9).

The power for operating the disposal device may be provided through an ordinary electrical outlet or by a battery source. Motor 46 is activated by a timer 80. Timer 80 is connected to an electrical power source 79 through a pressure actuated switch 74 and a relay switch 78. Switch 74 is supported upon a slat 28 and located under platform 32. Switch 74 is positioned so that as an animal, such as a dog 76 shown in FIG. 8, steps upon the upper run 24 of belt 22 and causes platform 32 to be depressed, the switch 74 will be contacted by the platform and actuated, causing the power circuit to the timer to be closed. At this time, the circuit to motor 46 remains open. After the animal has completed its bathroom duties and leaves upper run 24 of the belt, the platform will be urged into its upper position by springs 30, thereby releasing switch 74. The release of switch 74 causes the actuation again of switch 78 which starts timer 80 with the power circuit to the timer remaining closed. Both switch 78 and timer 80 are housed within box 10 near motor 46 and pump 52. Preferably after a short delay of 2 and ½ to 5 minutes, timer 80 will close the circuit to motor 46 to activate the motor to cause rotation of belt 22 and actuation of pump 52. After a suitable length of time, such as after belt 22 has experienced at least a half revolution to enable that portion of the belt upon which the animal had deposited its excreta to be cleansed by the liquid 70 being emitted through spray pipe 66, timer 80 will deactivate motor 46 and open the circuit between the timer and switch 78. The disposal device is now ready for use again.

Box 10 includes upper floor partitions 82 and 84 which are positioned at the ends of belt 22 and which extend from one side to the other of the box so as to prevent the animal from slipping or stepping down into the box. Partition 82 forms a fixed part of box 10. Partition 84 is located at the discharge end of belt 22 and is hinged for pivotal movement to the adjacent box end 14 at 86. A pivot arm 88 is connected to partition 84. One end of pivot arm 88 forms the shiftable member of a solenoid 90 which upon activation causes movement of the pivot arm and the opening of partition 84 so as to allow the solid matter 42 of the animal excreta to fall from the discharge end of belt 22 into the liquid 40 in drawer 38, as shown in FIG. 9. Solenoid 90 is activated by timer 80 simultaneously with the activation of motor 46. When the timer deactivates motor 46 to stop belt 22 and pump 52, solenoid 90 is deactivated to permit partition 84 to fall into the closed position shown in FIG. 3 where it is supported upon rests 91 mounted to each side of box 10.

The cleansing liquid 70 which is sprayed through pipe 66 against belt 22 will drip from the belt back into tank 36. A removable inclined deflector 94 is positioned over motor 46, pump 52, valve 60, relay switch 78 and timer 80 to prevent these components of the disposal device from being contacted by the cleansing liquid 70 and to direct the liquid into tank 36 as it drips from belt 22.

Figure 2:
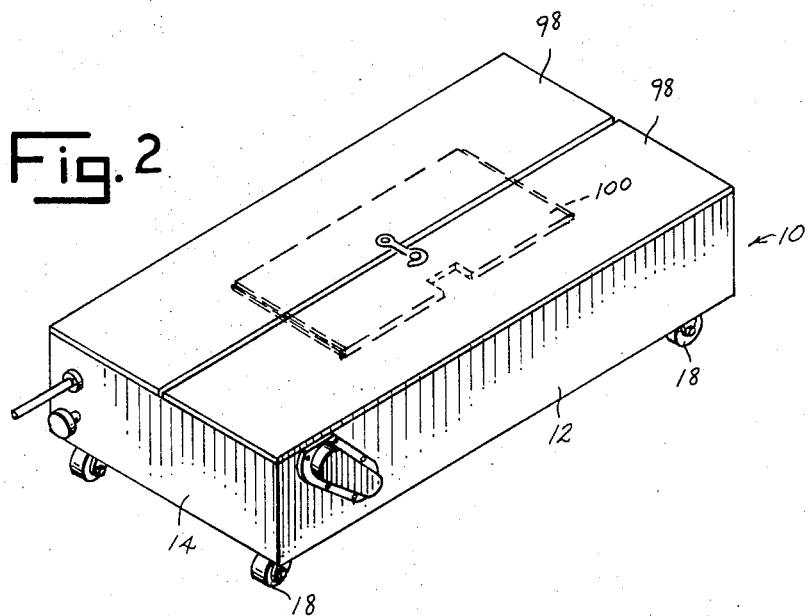
FIG. 2 is a perspective view of the apparatus shown in inoperative form suitable for storage.

It is to be understood that the liquid within tank 36 can be changed and replenished through a side opening (not shown) in box 10 or by removing drawer 38 and inserting one end of a hose or similar filling means into the tank. To drain tank 36, handle 62 is turned so as to place pipe 54 in fluid communication with drain conduit 68 and pump 52 started, such as by depressing platform 32 to actuate switch 74 or by a separate switch (not shown). Hinged side walls 98 are connected to the upper edges of sides 12 of box 10. A removable end wall 100 is inserted into grooved channels 99 between side walls 98 when the side walls are upright so as to form a three-sided box-like closure about the upper run 24 of belt 22. This three-sided closure is best seen in FIG. 1 and serves to make the animal feel more comfortable upon belt 22 and as a urine deflector. When it is desired to store the disposal device, end wall 100 is withdrawn from between side walls 98 and placed upon belt 22. The side walls are then folded over onto belt 22 and hooked together as shown in FIG. 2. It is to be understood that the belt and pump actuating components can be of a varied construction. Also the timing cycle for pump 52 and belt 22 can be varied, such as by having motor 46 activated immediately when the animal leaves upper run 24 of belt 22. Additionally, tank 36 and drawer 38 can be combined into a single receptacle.

It is contemplated that the above disposal could be adapted for connection into the pressurized water supply and waste disposal systems of the house or building. In this case, spray pipe 66 would be connected to the pressurized water supply with timer 80 activating a solenoid to control the flow of fluid through the spray pipe. A collection basin would replace tank 10 and drawer 38. The collection basin would be connected directly into the waste disposal line for the home or building. Excreta would pass from belt 22 into the basin and be flushed into the waste disposal line.

It is to be understood that the invention is not to be limited to the details above given, but may be modified within the scope of the appended claims.

I claim:

1. An animal waste disposal unit comprising conveyor means including an endless belt supported between spaced rollers and having an upper run where the animal stands to deposit its excreta, said belt having a discharge end, receptacle means at said belt discharge end, means for rotating said belt to cause the solid matter of said excreta deposited upon said upper belt run to be discharged into said receptacle means, means for actuating said belt rotating means after said animal deposits its excreta upon said upper belt run, spray means for directing a cleansing fluid against said belt as said belt is rotated, a box frame journaling said rollers and containing said belt and receptacle means and rotating means and actuating means and spray means, and a top partition carried by said frame and covering said receptacle means at said belt discharge end, said partition being generally parallel with said upper belt run and substantially continuous with the discharge end of said belt, means pivotally connecting said partition to said frame for movement to expose said receptacle means to permit said solid matter excreta to fall from said upper belt run into said receptacle means, said actuator means causing said movement of said partition at said rotation of said belt.

2. An animal waste disposal unit comprising conveyor means including an endless belt supported between spaced rollers and having an upper run where the animal stands to deposit its excreta, said belt having a discharge end, receptacle means at said belt discharge end, means for rotating said belt to cause the solid matter of said excreta deposited upon said upper belt run to be discharged into said receptacle means, means for actuating said belt rotating means after said animal deposits its excreta upon said upper belt run, and spray means for directing a cleansing fluid against said belt as said belt is rotated, said receptacle means being positioned under said belt, said belt having a lower run spaced below said upper belt run, said spray means including a nozzle part located between said lower belt run and said receptacle means and positioned to direct a spray against the lower belt run, said receptacle means constituting a first container located under the discharge end of said belt to catch said solid matter excreta and a second container located under said nozzle part to catch said cleansing fluid as it drips from said belt, said second container serving as a reservoir for said cleansing fluid, said spray means including means for draining said second container.

3. An animal waste disposal unit comprising a conveyor means including an endless belt supported between spaced rollers and having an upper run where the animal stands to deposit its excreta and a lower run spaced below said upper belt run, said belt having a discharge end, receptacle means positioned under said belt and extending to said discharge end thereof, means for rotating said belt to cause the solid matter of said excreta deposited upon said upper belt run to be discharged into said receptacle means, means for actuating said belt rotating means after said animal deposits its excreta upon said upper belt run, spray means including a spray part located between said lower belt run and said receptacle means and positioned to direct a spray of cleansing fluid against said lower belt run as said belt is rotated, and a shiftable platform extending between said rollers and contacting said upper belt run, biasing means located entirely between said upper and lower belt runs supporting said platform for shiftable movement as said animal steps upon said upper belt run, said biasing means constituting springs in supporting contact with said platform, said actuating means being operatively associated with said shiftable movement of the platform wherein rotation of said belt takes place only after said platform movement.

4. The disposal unit of claim 3 and a box frame journaling said rollers and containing said belt, receptacle means, rotating means, actuating means and spray means.

5. The disposal unit of claim 3 wherein said receptacle means constitutes a first container located under the discharge end of said belt to catch said solid matter excreta and a second container located under said nozzle part to catch said cleansing fluid as it drips from said belt.

6. The disposal unit of claim 5 wherein said first container constitutes drawer means carried within said box frame and being separable therefrom for emptying.

7. The disposal unit of claim 3 wherein said actuator means causes said belt to be rotated for a selected part of a turn.

* * * * *